United States Patent [19]

Appleyard et al.

[11] 4,020,020
[45] Apr. 26, 1977

[54] METHOD OF TREATING WASTE SHEET FLOORING

[75] Inventors: Francis J. Appleyard, East Petersburg; Stavros C. Stavrinou, Lancaster, both of Pa.

[73] Assignee: Armstrong Cork Company, Lancaster, Pa.

[22] Filed: June 17, 1975

[21] Appl. No.: 587,547

[52] U.S. Cl. .................................................. 260/2.3
[51] Int. Cl.² ........................................ C08J 11/04
[58] Field of Search ....................................... 260/2.3

[56] References Cited

UNITED STATES PATENTS

| | | | |
|---|---|---|---|
| 2,415,449 | 2/1947 | Sverdrup et al. | 260/2.3 X |
| 2,461,192 | 2/1949 | Banbury et al. | 260/2.3 X |
| 2,477,809 | 8/1949 | Kelly | 260/2.3 |
| 2,535,931 | 12/1950 | Kelly | 260/2.3 |
| 2,773,851 | 12/1956 | Tolman | 260/30.6 R |
| 2,853,742 | 9/1958 | Dasher | 18/48 |
| 3,056,224 | 10/1962 | Almy et al. | 41/23 |

*Primary Examiner*—Howard E. Schain
*Assistant Examiner*—W. C. Danison, Jr.

[57] ABSTRACT

Scrap sheet floor covering is recovered for reuse through the use of a Banbury mixer. The mixer grinds pre-diced scrap and abrades away asbestos filler backing material from the vinyl wear layer material. Binder scrap or virgin resin and plasticizer is added to convert the scrap sheet floor material to a raw material for use in manufacturing fiber filled vinyl tile.

3 Claims, 1 Drawing Figure

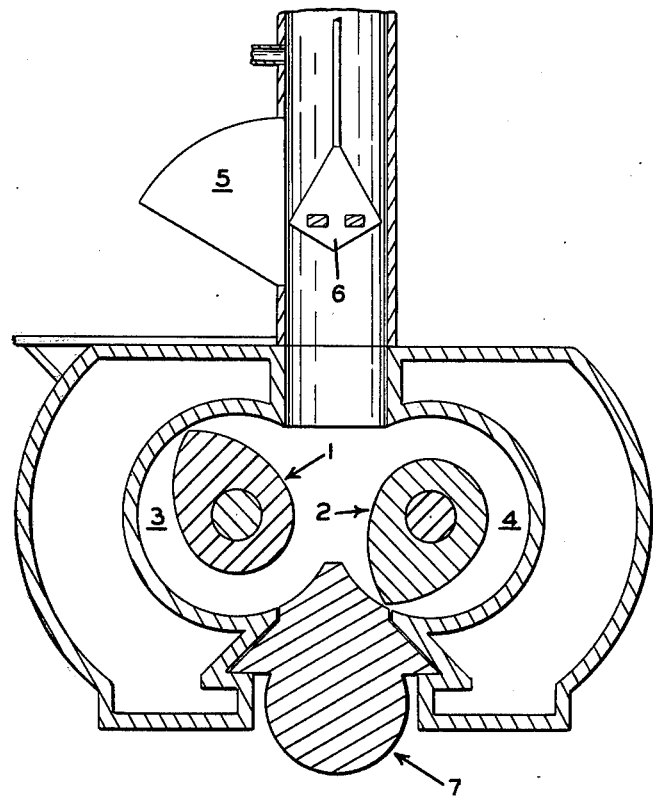

METHOD OF TREATING WASTE SHEET FLOORING

BACKGROUND OF THE INVENTION

1. Field of the Invention

The invention relates to a process for the treatment of waste sheet floor covering material for the purpose of converting it into raw material to be used in the manufacture of fiber reinforced tile floor material.

2. Description of the Prior Art

U.S. Pat. No. 3,056,224 discloses a sheet vinyl floor covering material which has the asbestos filler backing material fastened to a vinyl wear layer material.

U.S. Pat. No. 2,773,851 discloses vinyl composition for making a vinyl tile made with filler material.

U.S. Pat. No. 2,814,075 discloses a technique for recovering scrapped foamed latex. A Banbury mixer is used to grind up the scrap latex for subsequent reuse.

U.S. Pat. No. 2,853,742 is directed to a process for recovering powdered rubber from scrap vulcanized rubber through the use of a Banbury mixer.

SUMMARY OF THE INVENTION

The invention is directed to the concept of recovering scrap sheet flooring material such as that shown in U.S. Pat. No. 3,056,224. A Banbury mixer is used to grind pre-diced scrap. The Banbury mixer abrades away and pulverizes the backing of the sheet material, which backing is an asbestos filler material. The ground and pressurized scrap is mixed until the mixer reaches 300° F. (149° C.). A high binder scrap or virgin resin and plasticizer is added to the mix. An additional stabilizer may be added and thereafter the material is mixed to approximately 350° F. (176° C.). The material is then discharged from the Banbury mixer and may be utilized as part of the raw material used to make the vinyl tile of U.S. Pat. No. 2,773,851.

BRIEF DESCRIPTION OF THE DRAWING

The drawing is a schematic sectional representation of a Banbury mixer.

DESCRIPTION OF THE PREFERRED EMBODIMENT

Normally, the sheet flooring material of U.S. Pat. No. 3,056,224, if it was defective, would be scrapped and dumped in a land-fill dump. Defects of the nature being talked about are visual defects in the arrangements or lay-up of the chips which give an unpleasant aesthetic effect. Because of the chips are fastened to the backing, which is a beater saturated asbestos fiber felt, it was not considered feasible in the past to attempt to salvage scrap material. Several investigations were conducted into the possibility of removing the backing material from the vinyl face material, but invariably, these techniques involved high expenses or other production problems. Through the technique to be described below, it is now possible to take scrap sheet flooring material, such as disclosed in U.S. Pat. No. 3,056,224, and recover the scrap material for use in another product.

The recovered scrap material will be used to form a product such as that disclosed in U.S. Pat. No. 2,773,851. The product of that patent is a vinyl resin floor tile which contains filler material. The recovered scrap, processed by the invention to be described below, will be used as part of the raw material for forming the product of U.S. Pat. No. 2,773,851 and the asbestos fiber of the backing of the product shown in U.S. Pat. No. 3,056,224 will constitute part of the fibrous filler in the product of U.S. Pat. No. 2,773,851. Of primary importance herein is the fact that the recovered scrap replaces some of the virgin material which normally would be needed.

Scrap material of a structure according to U.S. Pat. No. 3,056,224 will initially be in sheet form in sheets of 6 foot (183 cm) width and of variable lengths. These sheets will be run through conventional dicing machines and converted to diced ¼ inch (0.6 cm) by ¼ inch (0.6 cm) square cubes; each cube will have basically the cross section shown in FIG. 3 of U.S. Pat. No. 3,056,224. That is, each cube will have on one side, the asbestos backing material, and on the other side thereof, some vinyl material which forms the wear layer of the flooring. These cubes will be charged into a conventional Banbury mixer.

The Banbury mixer has long been known and used in the rubber and plastic industry for masticating raw materials as well as mixing and compounding rubber and/or vinyl materials with fillers and other compounding agents. The machine basically comprises a pair of blade rotors 1 and 2 which are mounted for rotation adjacent each other in opposite directions within semi-cylindrical troughs or chambers 3 and 4. The rotors are so shaped as to smear the material in the chambers against the walls thereof, forcing the material upwardly and kneading it as it moves towards the longitudinal center of the machine from one chamber to the other chamber. The material is generally held within the chamber of the machine by a pneumatically operated ram 6. This ram is also capable of applying pressure to the mix within the Banbury mixer so that the mixing will be carried out under pressure. The general construction of the Banbury machine, in the form in which it has been used extensively in industry for breaking down and masticating materials and for compounding the same with fillers, etc., is shown, for example, in the Banbury U.S. Pat. No. 1,881,994.

After the pre-diced chips for sheet flooring are charged into the Banbury mixer (at port 5), pressure is applied by ram 6. The material is masticated for about 6 minutes with the ram resting on the mix (a ram pressure of 35 pounds (15.8 kg) per square inch (2.54 cm) is maintained on the air cylinder operating the ram) until the batch mix reaches a temperature of 300° F. (149° C.). At this point, the ram is lifted and then virgin resin, additional plasticizer and stabilizer are added. The batch is then mixed for about 3 minutes or until it reaches 350° F. (176° C.) to blend the new materials in with the materials previously in the Banbury mixer. This material is then discharged from the Banbury mixer and may be used in conventional manufacturing processes to form the product of U.S. Pat. No. 2,773,851.

It is possible to substitute low filler scrap from other unbacked high binder scrap sources in lieu of the virgin resin added to the Banbury mixer. It is also possible to combine various types of scrap in the original pre-diced mix. Determination of what will go into the Banbury mixer is simply a matter of balancing materials that are available against the result desired. As shown in U.S. Pat. No. 2,773,851, the mix for forming the tile product should contain a certain range of material. Therefore, one would initially charge into the Banbury scrap material which contains the different materials to be used in the end product. After the scrap is broken down by the intense shearing action of the mixer, then supplemental materials such as stabilizer, plasticizer, virgin resin, high vinyl scrap, or other materials are added to bring the Banbury mix up to a proportion of ingredients which will yield a product that can be used to replace a portion of the virgin raw materials in a tile batch falling under the standards for ingredients set forth in U.S. Pat. No. 2,773,851.

As one specific example of a product which has been carried through the above process, the following example is given. The Banbury mixer is initially charged with 600 pounds (270 kg) of pre-diced cubes of the material such as that shown in U.S. Pat. No. 3,056,224. This material is mixed for about 6 minutes with the ram resting on the mix and the batch is mixed until it reaches 300° F. (149° C.). Then 86 pounds (38.7 kg) of virgin resin are added along with 27 pounds (12.2 kg) of plasticizer and 6 pounds (2.7 kg) of stabilizer. This is then mixed with the ram applied for about 3 minutes until a temperature of 350° F. (176° C.) is reached. This then yields a product having the following composition.

| Ingredients | % By Weight |
|---|---|
| Resin | 32.3 |
| Plasticizer & stabilizer | 10.8 |
| Asbestos fiber | 25.3 |
| Limestone | 31.6 |

The above composition of material can then be utilized in the process of U.S. Pat. No. 2,773,851 to form a portion of the formulation of the product of that patent. The above composition of material will be used to form 2% to 12% of the final mix of material used to form the product of U.S. Pat. No. 2,773,851. For every 50 pounds (22.5 kg) of the above described recovered scrap mix from the Banbury used to make the product of U.S. Pat. No. 2,773,851, there is the following saving of material:

| | |
|---|---|
| Resin | 10.0 lbs. (4.5 kg) |
| Plasticizer | 3.5 lbs. (1.6 kg) |
| Asbestos | 12.5 lbs. (5.7 kg) |
| Limestone | 16.0 lbs. (7.3 kg) |

The difference between the total of the above and 50 pounds (22.5 kg) is the virgin resin and plasticizer which was added after the first blending step of the pre-diced chips. It is apparent that the use of tons of scrap per week recovered as described herein will result in substantial cost savings in the manufacture of floor tiles.

What is claimed is:

1. A process for recovering scrap sheet floor covering material which is composed of a felted fibrous backing cured to a nonfibrous resin wear surface which comprises the steps of;
   a. dicing said scrap sheet floor covering to reduce it to small pieces,
   b. masticating the sheet floor covering pieces with an intense shearing action while under mechanical compression to grind up the fibrous backing and the resin wear surface for the purpose of comingling these materials,
   c. adding supplemental resin materials to the comingled mass of fibrous backing and resin wear surface materials to the point that a desired ratio of resin to fibrous material is secured in the resulting mass, and
   d. blending the resulting mass which now blended can be utilized as part of a new floor covering materials of blended fiber and resin material.

2. The process of recovering scrap floor covering as set forth in claim 1 wherein said masticating of the fibrous backing and resin wear surface is carried out in a Banbury mixer until a mix temperature of 300° F. is reached.

3. The process for recovering scrap floor covering as set forth in claim 2 wherein said blending step is carried out until the mix temperature of 350° F. is reached.

* * * * *